United States Patent
Napier

(10) Patent No.: US 6,278,545 B1
(45) Date of Patent: Aug. 21, 2001

(54) MAGNIFICATION APPARATUS FOR PACKAGING

(76) Inventor: A. David Napier, P.O. Box 1226, Middlebury, VT (US) 05753

( * ) Notice: Subject to any disclaimer, the term of this patent is extended or adjusted under 35 U.S.C. 154(b) by 0 days.

(21) Appl. No.: 09/493,173

(22) Filed: Jan. 28, 2000

(51) Int. Cl.$^7$ .................................................... G02B 27/02
(52) U.S. Cl. ........................................... 359/440; 359/513
(58) Field of Search ........................... 359/436, 440–442, 359/802–805, 809–811, 815, 511, 513, 514

(56) References Cited

U.S. PATENT DOCUMENTS 5,204,775 * 4/1993 McDevitt ............................. 359/442
5,309,279 * 5/1994 Halstead ............................... 359/442

* cited by examiner

Primary Examiner—James Phan
(74) Attorney, Agent, or Firm—Carothers & Carothers

(57) ABSTRACT

The apparatus (10) for providing magnification for a package (1,2) is designed to provide the user with an apparatus that will allow the user to have a magnification unit to enable him or her to read the instructions of directions on the side of a package (1,2). This is especially valuable for use on prescription bottles used by elderly individuals in situations where improper use of medicines could lead to disastrous consequences. The magnification apparatus (10) for packaging (1,2) comprises a cap (12) that contains a magnifying lens (11) that is molded or manufactured into the cap (12). The focal length of the lens is designed to be longer than the package (1,2) that is positioned upon in order to minimize any problems caused by light at the focal point. The lens (11) can be clear, opaque or colored as determined by the contents of the package (1,2). The user adjusts the apparatus (10) as necessary to read the instructions on the side of the packaging.

7 Claims, 2 Drawing Sheets

MAGNIFICATION APPARATUS FOR PACKAGING

BACKGROUND OF THE INVENTION

This invention pertains to packages of all types and, in particular, to a magnification apparatus for packaging that would allow individuals to read the instructions or information on the side of the box or bottle insuring that the individual using the items in the package will be used properly.

There is a growing problem in this country as the population ages. There is a growing problem with people not taking their medicines properly. At the same time, more and more people need to use glasses in order to read properly. One of the problems with medications and drugs is that the instructions on the bottles and other packaging is often too small to be easily read. What is needed is a device that would provide magnification in order to aide the user's of the medication to read the instructions on the bottle. It is also necessary to have the magnification in close proximity to the bottle or package itself in order to have it useable.

What is needed is a magnification device for packaging that is accessible to the user and would provide an easy means for reading the instructions on the side of the packaging for medications without requiring the individual to carry a separate device. It is an object of this invention to provide an apparatus that will be particularly helpful for seniors or those who have vision problems who find themselves in need of understanding printed instructions.

It is the object of this invention to teach a magnification apparatus for packaging which avoids the disadvantages and limitations recited above in other magnification systems. Another object of this invention is to provide an apparatus that is inexpensive to manufacture, can be easily used and set up by the manufacturer of the packaging and is, at the same time, accurate and highly effective.

SUMMARY OF THE INVENTION

Particularly, it is the object of this invention to teach a magnification apparatus for packaging, for use by individuals in order to provide a device for reading information and instructions on packages in order to prevent accidents caused by improper use of medicines, drugs or the like, comprising means for sealing said package; said means for sealing said package having at least one magnification means connected thereto in order to provide the user ease of reading the information on said package; and said sealing means and said magnification means comprise an integral unit.

It is also the object of this invention to teach a magnification apparatus for packaging, for use by individuals in order to provide a device for reading information and instructions on packages in order to prevent accidents caused by improper use of medicines, drugs or the like, comprising in combination first means comprising a sealing for packages, and second means comprising at least one magnification means connected thereto in order to provide the user ease of reading the information on said package; and said first means and said second means comprising an integral unit.

BRIEF DESCRIPTION OF THE DRAWINGS

Further objects and features of this invention will become more apparent by reference to the following description taken in conjunction with the following figures, in which.

DETAILED DESCRIPTION OF THE PREFERRED EMBODIMENT

Figure 1:
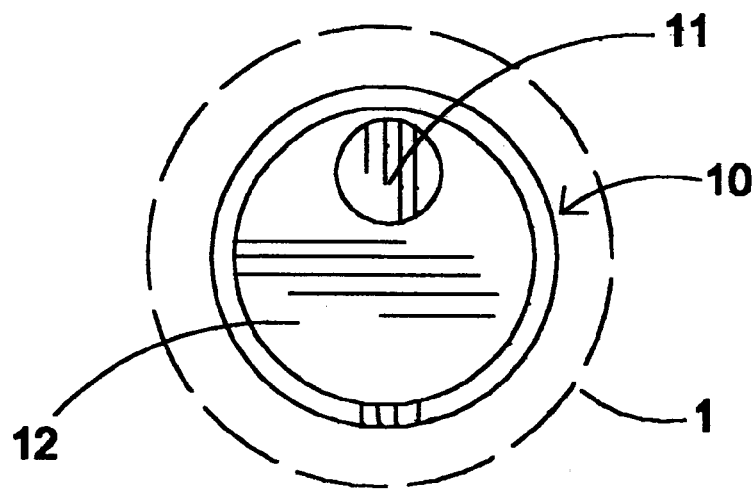
FIG. 1 is a top plan view of the novel magnification apparatus for packaging.
Figure 2:
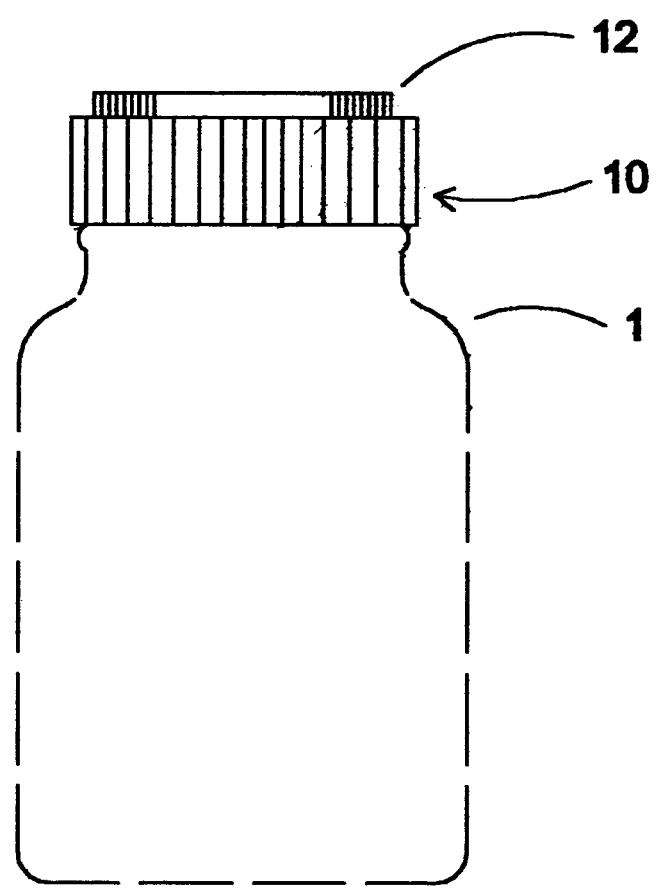
FIG. 2 is a side elevation view thereof.
Figure 3:
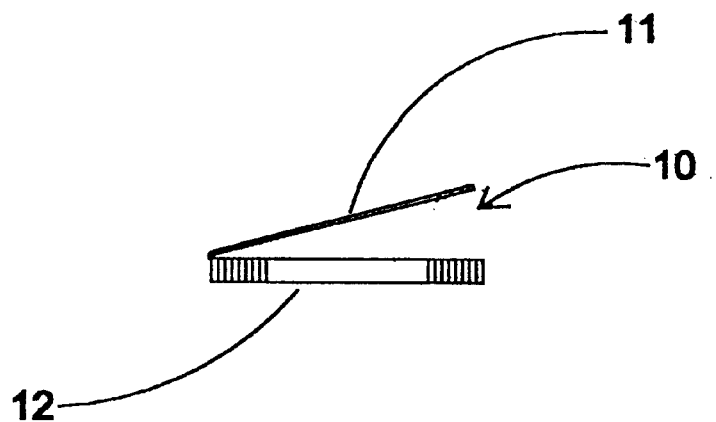
FIG. 3 is a side elevational view of the hinged embodiment of the magnification apparatus for packaging.
Figure 4:
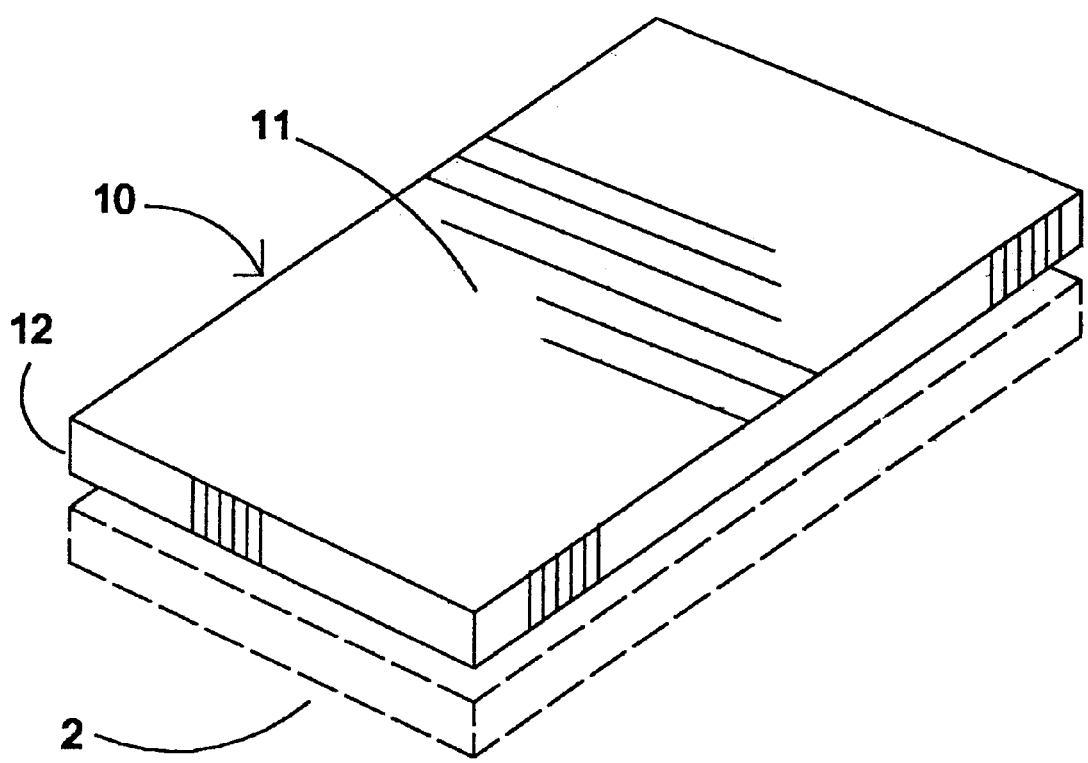
FIG. 4 is a perspective view of a box type unit having the magnification apparatus for packaging.

As shown in the figures, the novel magnification apparatus for packaging 10 comprises a magnifying device such as a magnifying lens 11 that is positioned in the cap 12 of a bottle 1 or other package 2. The lens 11 can be a portion of the cap 12 or encompass the entire cap surface. This can be accomplished by molding the lens or lenses into the cap, although the lens could be hinged into the cap as shown in FIG. 3 or inserted into a sliding mechanism and be pulled out as necessary. The magnifying lens 11 can be colored as necessary to limit potential problems with light or heat effecting the contents of the packaging or the bottle. The focal point of the magnification lens has to be designed to be longer than the height of the package so that any problems with heat build up and the coloring caused by the magnification apparatus will be minimized because of lighting affecting the contents of the bottle or package. This is not necessary with the hinged version of the magnification apparatus. The hinged magnification apparatus is especially appropriate where liquid contents are involved, or where it is extremely important that no light enter through the lid. There are a number of different ways of accomplishing the attachment of a magnification device to packages. If the top section of a box is a top flap or lid of a box, that flap can be made of a plastic and be made in the shape of a lens in order to create a magnification apparatus on the top of a box. The flap can be removed to facilitate the reading of the instructions or information on the side of the package, whether bottle or box.

In operation, there are a number of applications for the magnification apparatus for packaging. The user will open the bottle of medication, vitamins, food or other product that require proper consumption and then manually focus the lens on the instruction in order to read the proper dosage of the medication for his or her circumstances. Light sensitive drugs would require a magnification apparatus for packages that would be color coded so as to avoid a problem with light sensitivity.

While I have described my invention in connection with specific embodiments thereof, it is clearly to be understood that this is done only by way of example and not as a limitation to the scope of my invention as set forth in the objects thereof and in the appended claims.

I claim:

1. A magnification apparatus for packaging, for use by individuals in order to provide a device for reading information and instructions on packages having an access opening in order to prevent accidents caused by improper use of medicines or drugs, comprising;

means for sealing an access opening of a package;

said means for sealing having at least one magnification means connected thereto in order to provide the user ease of reading the information on said package; and said sealing means and said magnification means comprise an integral unit.

2. A magnification apparatus for packaging, according to claim 1, wherein:

said means for sealing comprises the cap of a bottle.

3. A magnification apparatus for packaging, according to claim 1 wherein;

said means for sealing comprises the top flap of a box type package.

4. A magnification apparatus for packaging, according to claim 1, wherein:

said magnification means comprises magnifying glass positioned within said sealing means.

5. A magnification apparatus for packaging, according to claim 4, wherein:

said magnification glass comprises means molded into said sealing means.

6. A magnification apparatus for packaging, according to claim 4, wherein:

said magnification glass comprises means hinged onto said sealing means.

7. A magnification apparatus for packaging, for use by individuals in order to provide a device for reading information and instructions on packages in order to prevent accidents caused by improper use of medicines or drugs, comprising in combination:

first means comprising means for sealing an access opening of a package, and second means comprising at least one magnification means connected thereto in order to provide the user ease of reading the information on a package; and said first means and said second means comprising an integral unit.

* * * * *